UNITED STATES PATENT OFFICE.

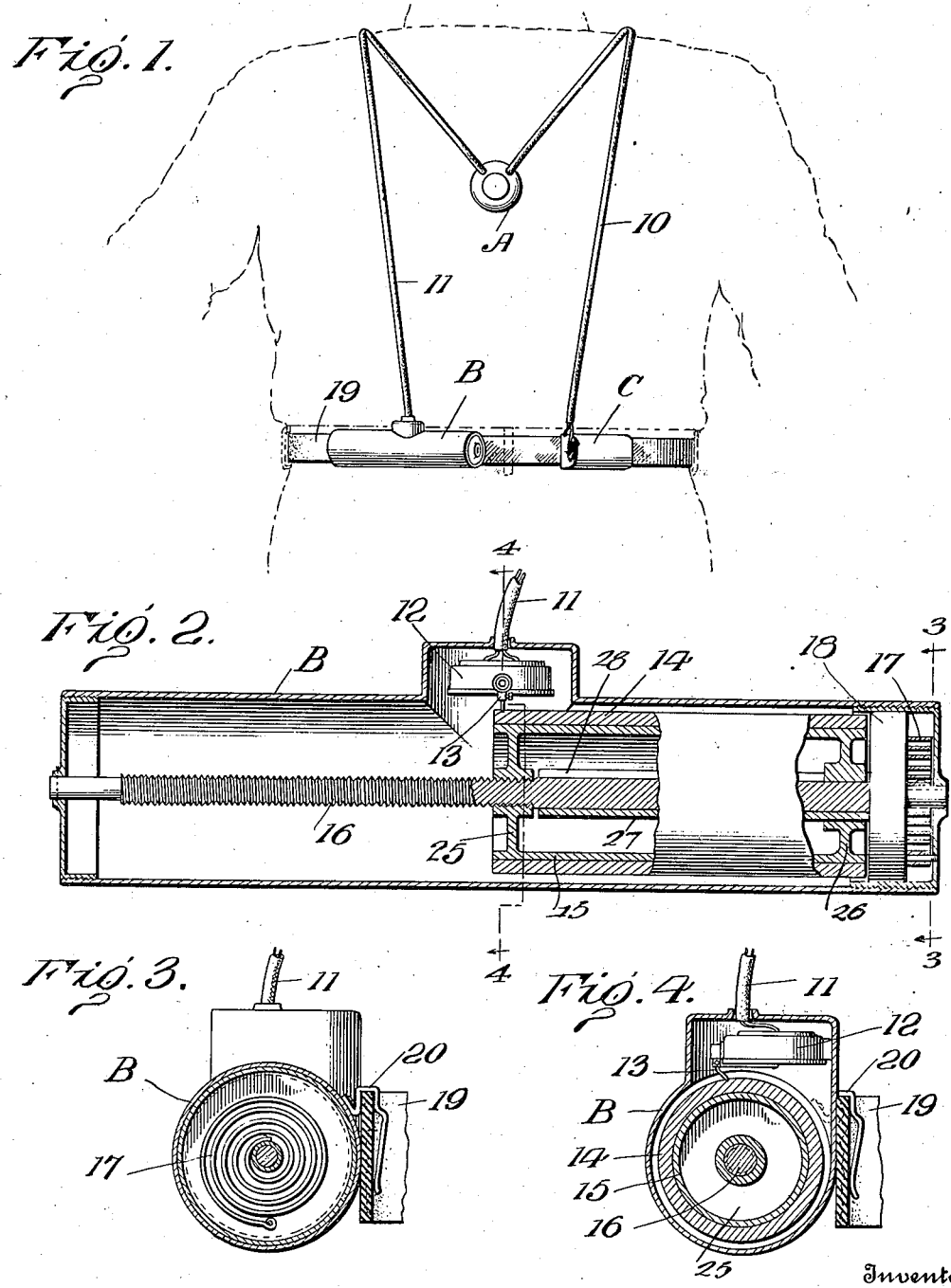

WILLIAM HEYMANN, OF WASHINGTON, DISTRICT OF COLUMBIA.

DICTOGRAPH APPARATUS.

1,191,182.  Specification of Letters Patent.  Patented July 18, 1916.

Application filed August 28, 1914. Serial No. 859,109.

*To all whom it may concern:*

Be it known that I, WILLIAM HEYMANN, a citizen of the United States, residing at Washington, in the District of Columbia, have invented and discovered certain new and useful Improvements in Dictograph Apparatus, of which the following is a specification.

The object of my said invention is to provide a recording instrument of a nature adapted to record ordinary conversations, which can be worn on the person in a manner to be conveniently concealed, whereby any conversation between two parties may be recorded and afterward reproduced, the instrument being intended primarily for use in detective and such like work.

Referring to the accompanying drawings which are made a part hereof, and on which similar reference characters indicate similar parts, Figure 1 is a diagrammatic view illustrating my invention as on the person of a user, Fig. 2 a sectional view through the recording instrument, Fig. 3 a cross section on the dotted line 3—3 in Fig. 2, and Fig. 4 a cross-section on the dotted line 4—4 in Fig. 2.

In said drawings the portions marked A represent the receiver, B the recorder, and C a battery.

The receiver A is an ordinary dictograph receiver, or a receiver of any appropriate form or construction. It is electrically connected on one side to the battery C by wires contained in a cable 10, and on the other side to the recording instrument B by wires contained in a cable 11.

The recording instrument B consists of a casing containing a transmitter 12 having a stylus 13 in position to operate on the prepared surface of a cylinder 14 carried on a central cylindrical body 15. Said cylinder body 15 has a head 25 at its inner end, having a hub containing a screw-threaded perforation which engages the screw-threads of the central shaft 16 on which it is mounted, and its other end is provided with a head 26, the hub of which is perforated to slide on a sleeve 27 surrounding and free to rotate on said shaft at the end of the casing adjacent to the operating mechanism. Said sleeve 27 is formed with a slot 28 in one side, in which a tongue of the head 26 is adapted to engage to insure the rotation of cylinder 14 as it moves longitudinally of the casing. Said sleeve 27 is adapted to be actuated by a coiled spring 17 and clock work mechanism in the casing 18 adjacent thereto. The casing has a screw-cap at each end, as shown, to facilitate the insertion and removal of the parts.

The recording instrument B may be attached to a belt 19 worn around the waist by means of a hook 20 and the battery case C is attached to the same belt in the same manner.

The instrument is intended to be worn as indicated in Fig. 1 with the receiver A preferably concealed beneath the wearer's shirt-front so that the conversation may be recorded without knowledge of the party being interviewed.

Having thus fully described my said invention what I claim as new and desire to secure by Letters Patent is:

A portable dictograph apparatus adapted to be worn concealed upon the person comprising a shaft, means for rotating said shaft, a record blank on said shaft, an electric recorder mounted to record upon said record blank, a casing inclosing said mechanism, means on said casing for detachably securing the same on the person, an electric battery also adapted for ready attachment on the person, a cable connecting said battery with said electric recorder, and a receiver interposed in the circuit, substantially as set forth.

In witness whereof, I have hereunto set my hand and seal at Washington, District of Columbia, this twenty-eighth day of August, A. D. nineteen hundred and fourteen.

WILLIAM HEYMANN. [L. S.]

Witnesses:
E. W. BRADFORD,
T. A. BRADDOCK.